United States Patent
Yamamoto (10) Patent No.: US 6,542,005 B2
(45) Date of Patent: Apr. 1, 2003

(54) SEMICONDUCTOR INTEGRATED CIRCUIT AND METHOD OF DESIGNING THE SAME

(75) Inventor: Hiroshi Yamamoto, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/768,693

(22) Filed: Jan. 24, 2001

(65) Prior Publication Data

US 2001/0009381 A1 Jul. 26, 2001

(30) Foreign Application Priority Data

Jan. 26, 2000 (JP) .................................... 2000-016448

(51) Int. Cl.[7] .................. H03K 19/00; H01L 27/10
(52) U.S. Cl. .................. 326/93; 326/101; 257/204; 257/205; 257/206; 257/368; 257/401
(58) Field of Search ................ 326/93, 95, 98, 326/101; 257/204, 205, 206, 368, 401

(56) References Cited

U.S. PATENT DOCUMENTS

| | | | | |
|---|---|---|---|---|
| 4,588,903 A | * | 5/1986 | Johnson | 326/17 |
| 5,285,096 A | * | 2/1994 | Ando et al. | 257/379 |
| 5,914,516 A | * | 6/1999 | Konno | 257/357 |
| 6,053,950 A | * | 4/2000 | Shinagawa | 703/19 |
| 6,090,650 A | * | 7/2000 | Dabral et al. | 438/195 |
| 6,092,211 A | * | 7/2000 | Hozumi | 713/500 |

FOREIGN PATENT DOCUMENTS

| | | | | |
|---|---|---|---|---|
| JP | 3-034365 | | 2/1991 | |
| JP | 404027155 A | * | 1/1992 | 257/368 |
| JP | 9-331238 | | 12/1997 | |
| JP | 10-340957 | | 12/1998 | |
| JP | 11-068046 | | 3/1999 | |

* cited by examiner

*Primary Examiner*—Michael Tokar
*Assistant Examiner*—Vibol Tan
(74) *Attorney, Agent, or Firm*—Katten, Muchin, Zavis Rosenman (57) ABSTRACT

A semiconductor integrated circuit is provided with logic circuits having transistors. The semiconductor integrated circuit is also provide with a clock tree including clock drivers which have transistors to distribute a clock signal to the logic circuits. Gate lengths of the transistors provided in the clock drivers are longer than that of the transistors provided in the logic circuits.

17 Claims, 12 Drawing Sheets

16 CLOCK DRIVERS

FIG. 13B

16 CLOCK DRIVERS

SEMICONDUCTOR INTEGRATED CIRCUIT AND METHOD OF DESIGNING THE SAME

BACKGROUND OF THE INVENTION

1. Field of the Invention

The present invention relates to a semiconductor integrated circuit such as a large scale integrated circuit (LSI) and a method of designing the same, and in particular, a semiconductor integrated circuit, in which clock skew is suppressed, and a method of designing the same.

2. Description of the Related Art

An LSI chip is provided with a core region (internal circuit) for various processing in synchronization with clock signals and an input/output circuit region for transmitting and receiving signals between the core region and the outside. In the core region, a plurality of flip-flop groups and a clock tree consisting of clock drivers in a plurality of stages for distributing the clock signals to these flip-flop groups.

Figure 1A:
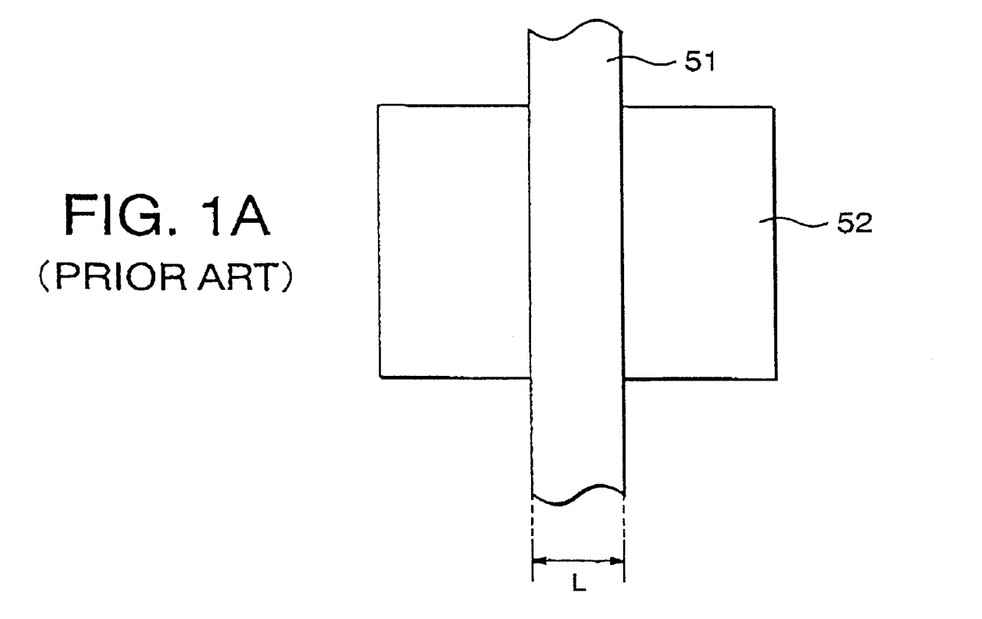
FIG. 1A is a schematic view showing a transistor composing a conventional clock driver.
Figure 1B:
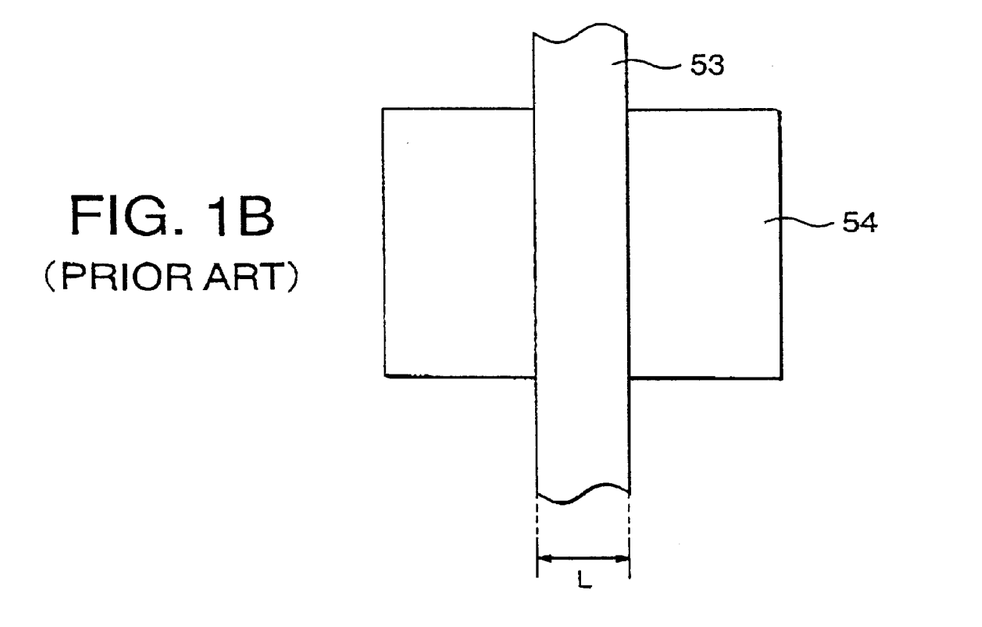
FIG. 1B is a schematic view showing a transistor composing a flip-flop group.

FIG. 1A is a schematic view showing a transistor composing a conventional clock driver, and FIG. 1B is a schematic view showing a transistor composing a flip-flop group.

In a conventional LSI or the like, as shown in FIGS. 1A and 1B, a transistor composing a clock driver is provided with a gate electrode 51 and source drain diffusion layers 52, and a transistor composing a flip-flop group is provided with a gate electrode 53 and source drain diffusion layers 54. The gate lengths of the gate electrodes 51 and 53 are equal to each other in design, for example, "L".

Figure 2A:
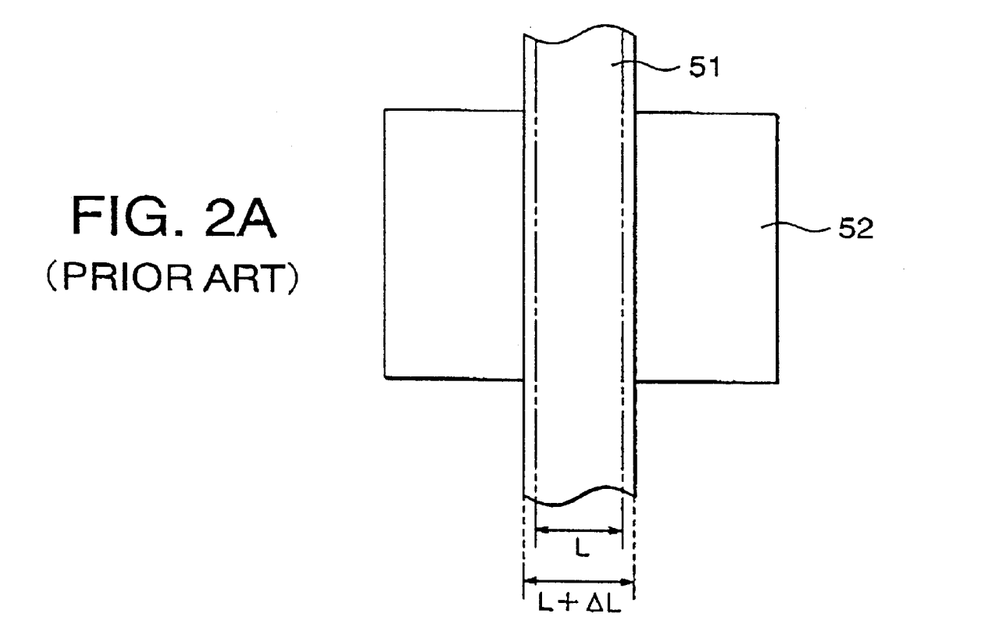
FIGS. 2A and 2B are schematic views showing a transistor in a case where the gate length becomes longer due to a dimensional difference in a conventional LSI.
Figure 2B:
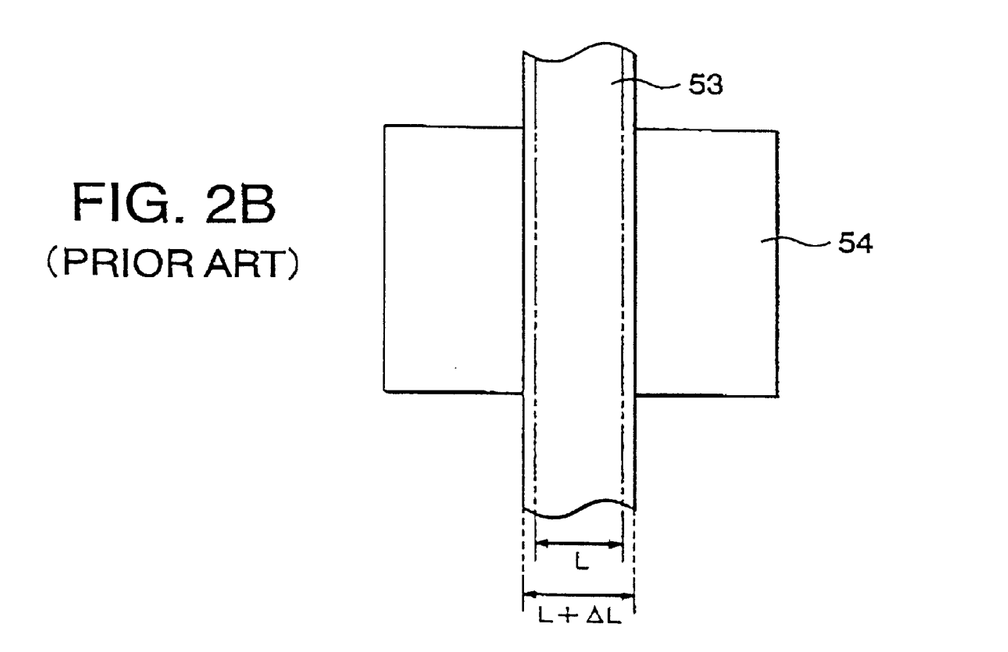
Figure 3A:
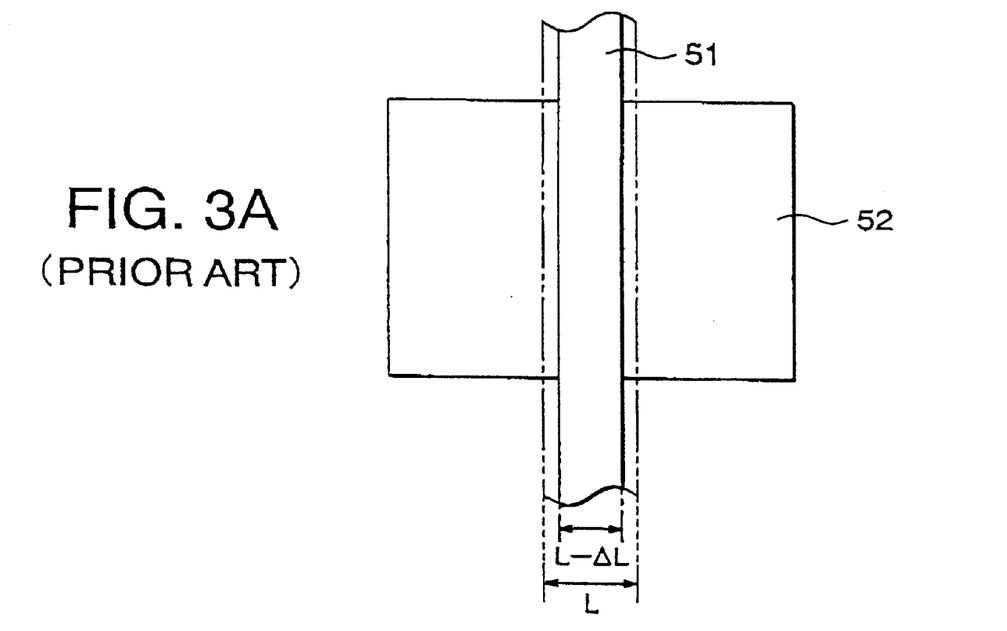
FIGS. 3A and 3B are schematic views showing a transistor in a case where the gate length becomes shorter due to a dimensional difference in a conventional LSI.
Figure 3B:
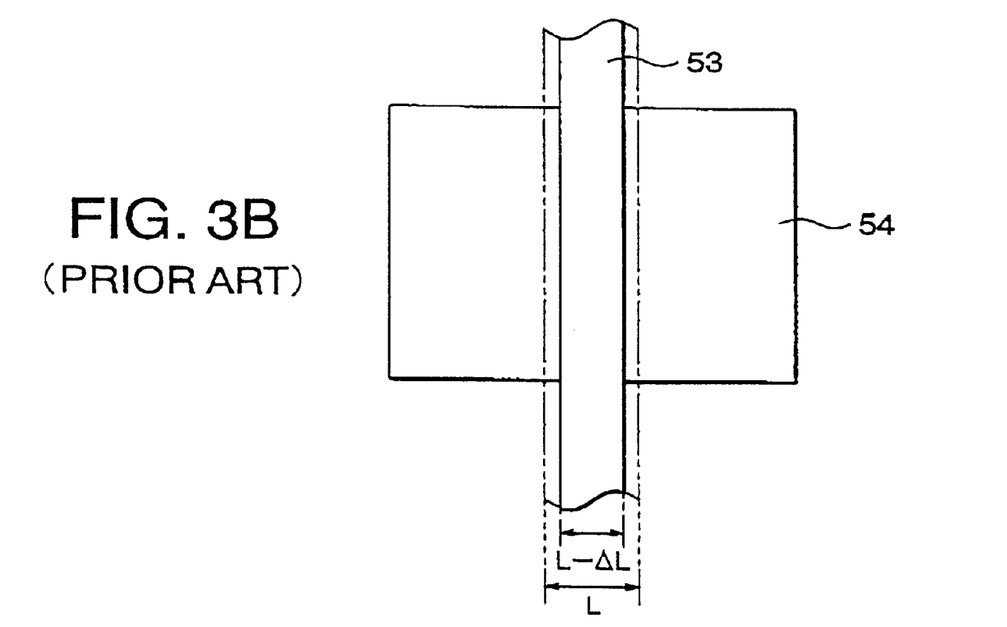

However, in actual processing, it is extremely difficult to completely prevent dispersion in the gate lengths in the process of etching or the like, so that the clock driver and the flip-flop group have dimensional differences of the same degree to each other. FIGS. 2A and 2B shows transistors in a case where the dimensional differences make the gate lengths longer in a conventional LSI, wherein FIG. 2A is a schematic view showing a transistor composing a clock driver, and FIG. 2B is a schematic view showing a transistor composing a flip-flop group. FIGS. 3A and 3B show transistors in a condition where the gate lengths become shorter due to the dimensional differences in a conventional LSI, wherein FIG. 3A is a schematic view showing a transistor composing a clock driver, and FIG. 3B is a schematic view showing a transistor composing a flip-flop group.

If the gate lengths become longer by "$\Delta L$", due to a dimensional difference, both the gate lengths of the transistor composing a clock driver and the transistor composing a flip-flop group are "$L+\Delta L$" as shown in FIGS. 2A and 2B. Therefore, both the relative errors in these gate lengths are "$\Delta L/L$".

On the other hand, if the gate lengths become shorter by "$\Delta L$" due to dimensional differences, both the gate lengths of the transistor composing a clock driver and the transistor composing a flip-flop group are "$L-\Delta L$" as shown in FIGS. 3A and 3B. Therefore, in this case, the relative errors in these gate lengths are also "$\Delta L/L$".

Figure 4:
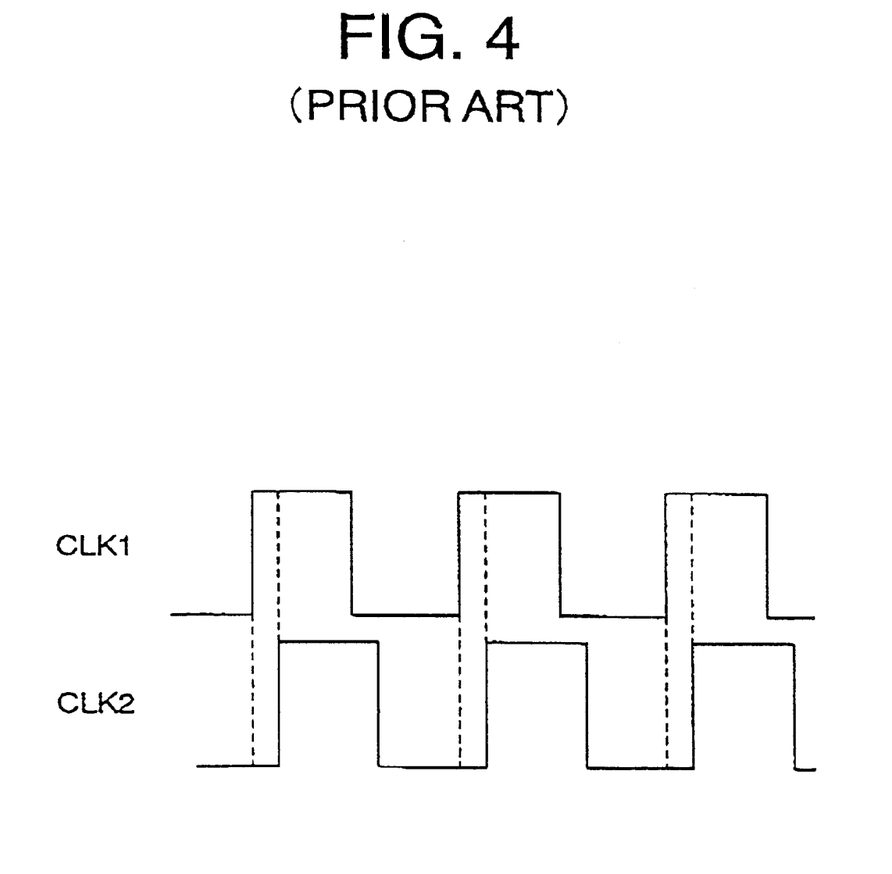
FIG. 4 is a timing chart showing clock skew between two flip-flop groups.

If such unevenness in the gate lengths occurs, clock skew described below occurs. FIG. 4 is a timing chart showing clock skew between two flip-flop groups. Herein, gate lengths in a first flip-flop group and a clock driver which transmits a clock signal CLK1 to the first flip-flop group have been "$L-\Delta L$", and gate lengths in a second flip-flop group and a clock driver which transmits a clock signal CLK2 to the second group have been "$L+\Delta L$".

Generally, in a case where the gate width is constant, when the gate length becomes longer, the drive capability of the transistor lowers, and delay time of the clock signal becomes greater. Therefore, the clock signal CLK1 is transmitted to the first flip-flop group more quickly than the designed time, and the clock signal CLK2 is transmitted later than the designed time. As a result, as shown in FIG. 4, clock skew occurs between the two clock signals CLK1 and CLK2.

If such an influence of clock skew becomes greater, the first and second flip-flop groups cannot simultaneously operate. Therefore, in such an LSI, the period of the clock signal must be increased to a degree at which the influence of clock skew can be ignored, which inevitably results in a lowering of the operation speed by lowering the frequency.

Such problems caused by clock skew are remarkable when the gate length is shortened to approximately 0.18 $\mu$m and the frequency of the LSI is increased to approximately 200 MHz, so that further reduction in the gate length and further increase in the speed of the LSI are difficult.

In Japanese Unexamined Patent Publication No. Hei 9-331238, a semiconductor integrated circuit is disclosed in which the gate length of a specific transistor composing a pulse generation circuit is made long in order to prevent unevenness in the standard pulse widths with respect to unevenness in the gate lengths. However, in this conventional semiconductor integrated circuit, clock skew caused by dispersion in manufacturing cannot be suppressed although fluctuation in the pulse width can be suppressed.

SUMMARY OF THE INVENTION

The object of the present invention is to provide a semiconductor integrated circuit which can suppress clock skew due to dispersion in manufacturing and a method of designing the same.

According to one aspect of the present invention, a semiconductor integrated circuit comprises logic circuits and a clock tree including clock drivers. The logic circuits have transistors. The clock drivers also have transistors to distribute a clock signal to the logic circuits. Gate lengths of the transistors provided in the clock drivers are longer than that of the transistors provided in the logic circuits.

In the invention, since the gate length of the transistor provided in the clock driver is made longer than that of the transistor provided in the logic circuit, even if the gate lengths become uneven in the process of etching or the like in the manufacturing process, the relative error in the gate length of the transistors in the clock driver can be made smaller than that of the transistor in the logic circuit. Therefore, the unevenness in the drive capability between the clock drivers can be suppressed. As a result, clock skew due to dispersion in manufacturing between the logic circuits connected to a distal end of the clock tree is suppressed.

Another aspect of the present invention, a method of designing a semiconductor integrated circuit which has logic circuits which have transistors and a clock tree including clock drivers which have transistors, the clock drivers distributing a clock signal to the logic circuits, the method comprises the step of setting gate lengths of the transistors provided in the clock drivers so as to be longer than that of the transistors provided in the logic circuits.

BRIEF DESCRIPTION OF THE DRAWINGS

FIGS. 6A and 6B are drawings showing the structure of the clock driver in FIG. 5, wherein

DETAILED DESCRIPTION OF THE PREFERRED EMBODIMENTS

Figure 5:
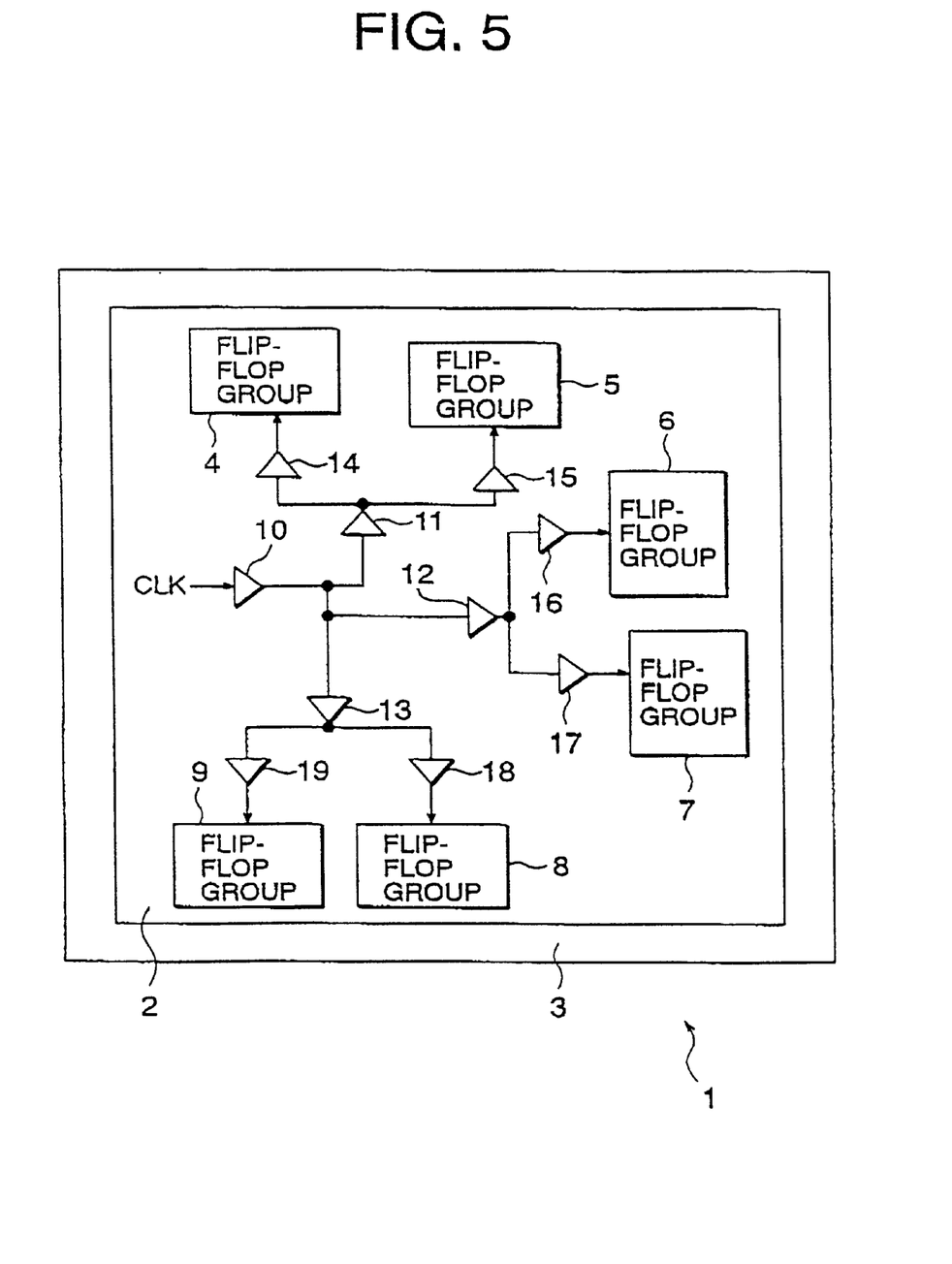
FIG. 5 is a schematic view showing an LSI chip provided with a semiconductor integrated circuit according to an embodiment of the present invention.

The preferred embodiment of the semiconductor integrated circuit of the present invention is explained in detail below with reference to the accompanying drawings. FIG. 5 is a schematic view showing an LSI chip provided with the semiconductor integrated circuit according to an embodiment of the present invention.

Core (internal circuit) region 2 for various processing in synchronization with clock signals CLK and an input/output circuit region 3 for transmitting and receiving signals between the core region 2 and the outside are provided on an LSI chip 1. A plurality of flip-flop groups 4 to 9 are provided in the core region 2, Furthermore, in the core region 2, a clock tree is provided, which is composed of clock drivers 10 to 19 in a plurality of stages for distributing the clock signals CLK to the flip-flop groups 4 to 9. The present embodiment of the invention corresponds to such a core region 2.

Figure 6A:
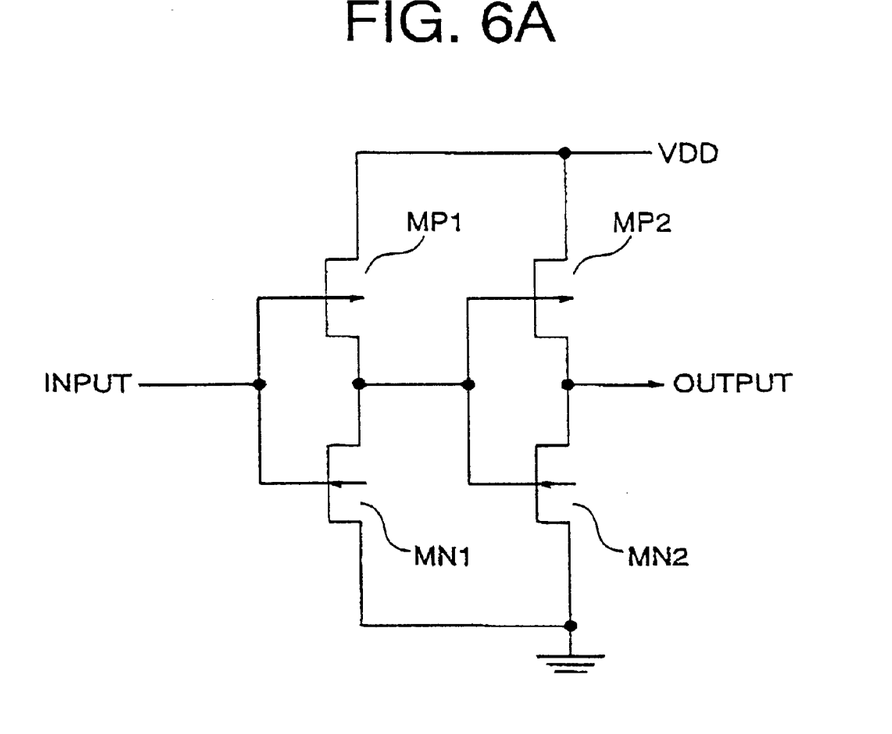
FIG. 6A is a circuit diagram and FIG. 6B is an equivalent circuit schematic.
Figure 6B:
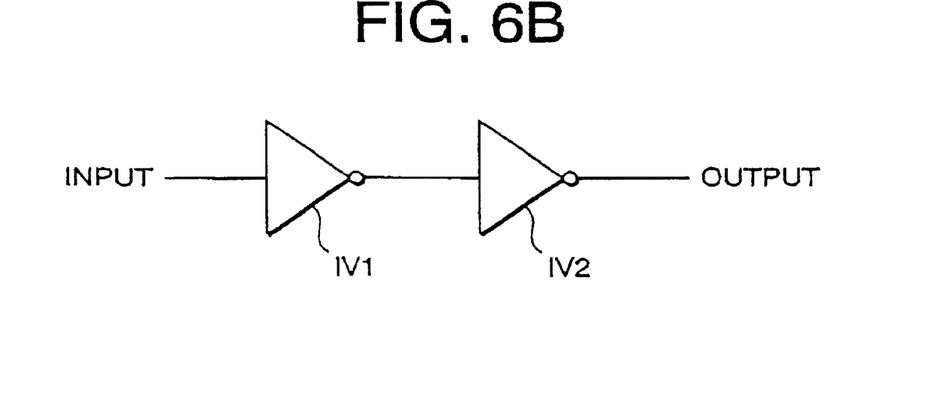

FIG. 6A and FIG. 6B show the structure of the clock driver in FIG. 5, wherein FIG. 6A is a circuit diagram, and FIG. 6B is an equivalent circuit schematic.

The clock driver provided in the present embodiment is provided with a P-channel transistor MP1 and an N-channel transistor MN1 each gate of which is connected to the input terminal. A power voltage VDD is supplied to the source of the P-channel transistor MP1, and the source of the N-channel transistor MN1 is grounded. The drains of the P channel transistor MP1 and the N-channel transistor MN1 are connected to each other for the present embodiment to have an inverter IV1.

In addition, a P-channel transistor MP2 and an N-channel transistor MN2 are provided whose gates are connected to the output terminal of the inverter IV1, that is, the common connection point of the drains of the P-channel transistor MP1 and the N-channel transistor MN1. The power voltage VDD is supplied to the source of the P-channel transistor MP2, and the source of the N-channel transistor MN2 is grounded. The drains of the P-channel transistor MP2 and the N-channel transistor MN2 are connected to each other for the present embodiment to have an inverter IV2.

In FIG. 5, six flip-flop groups and ten clock drivers are shown, however, in actuality, the number of stages of the clock drivers are about 4 to 10, and the number of clock drivers is about 1000, and the number of flip-flop groups accords to these numbers. The number of transistors in the logic circuits in the flip-flop groups is, for example, approximately $10^6$ in total.

Figure 7A:
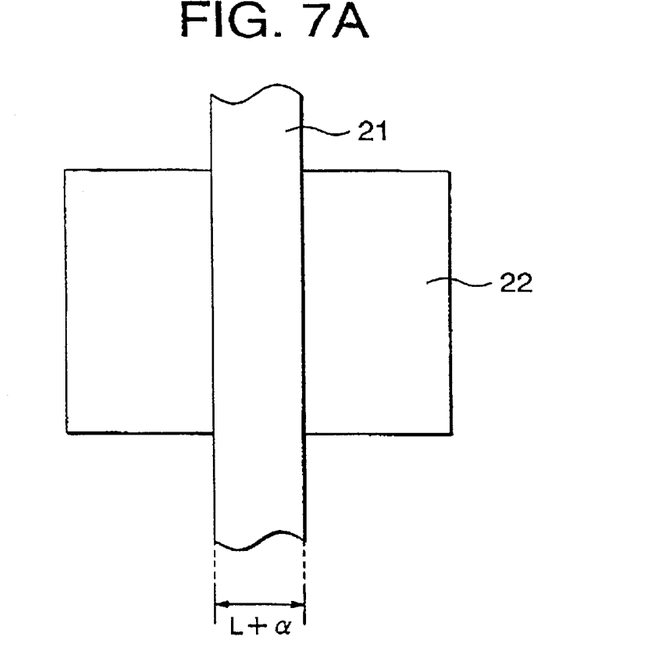
FIG. 7A is a schematic view showing a transistor composing a clock driver in FIG. 5.
Figure 7B:
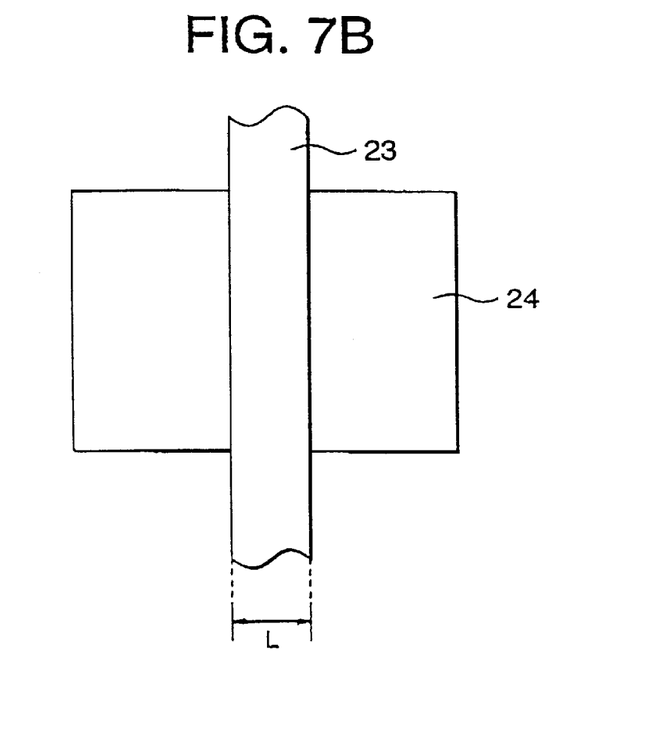
FIG. 7B is a schematic view showing a transistor composing a flip-flop group in FIG. 5.

FIG. 7A is a schematic view showing a transistor in a clock driver in FIG. 5, and FIG. 7B is a schematic view showing a transistor in a flip-flop group in FIG. 5.

In the present embodiment, as shown in FIG. 7A and FIG. 7B, a transistor in a clock driver is provided with a normal gate electrode 21 and source-drain diffusion layers 22, and a transistor in a flip-flop group is provided with a normal gate electrode 23 and source-drain diffusion layers 24. The gate length of the gate electrode 23 is expressed as "L" in the design, and the gate length of the gate electrode 21 is expressed as "L+α (α>0)" in the design. The value of "L" is, for example, 0.18 µm, however, the value is not limited to this.

Figure 8A:
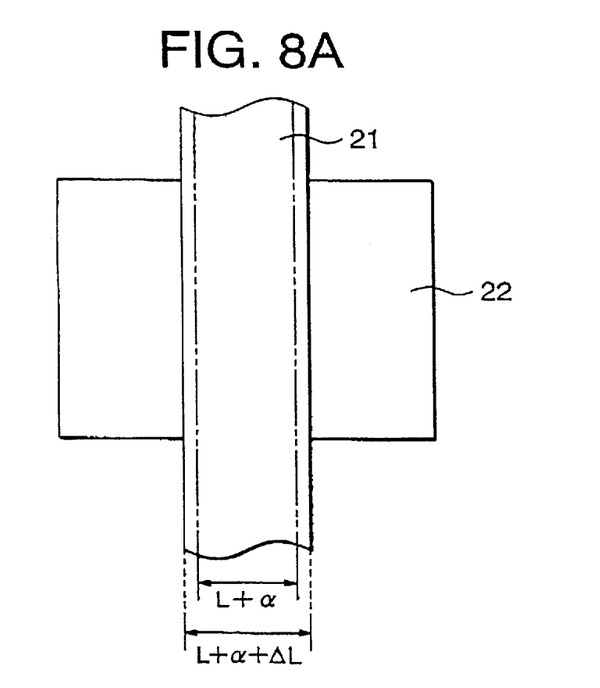
FIG. 8 is a schematic view showing the transistor in a case where the gate length becomes longer due to a dimensional difference in the embodiment of the invention.
Figure 8B:
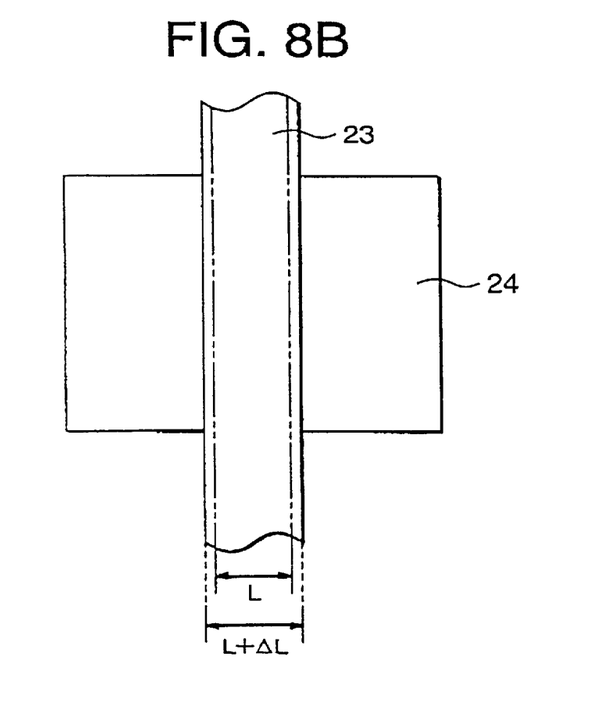
Figure 9A:
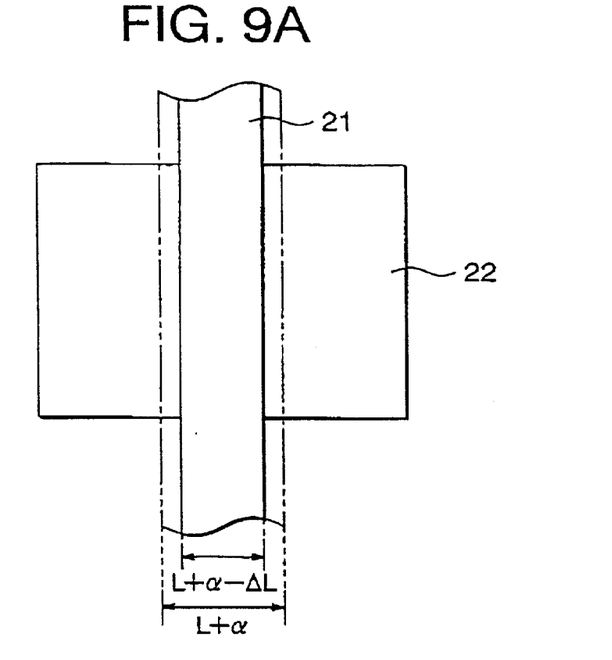
FIG. 9 is a schematic view showing the transistor in a case where the gate length becomes shorter due to a dimensional difference in the embodiment of the invention.
Figure 9B:
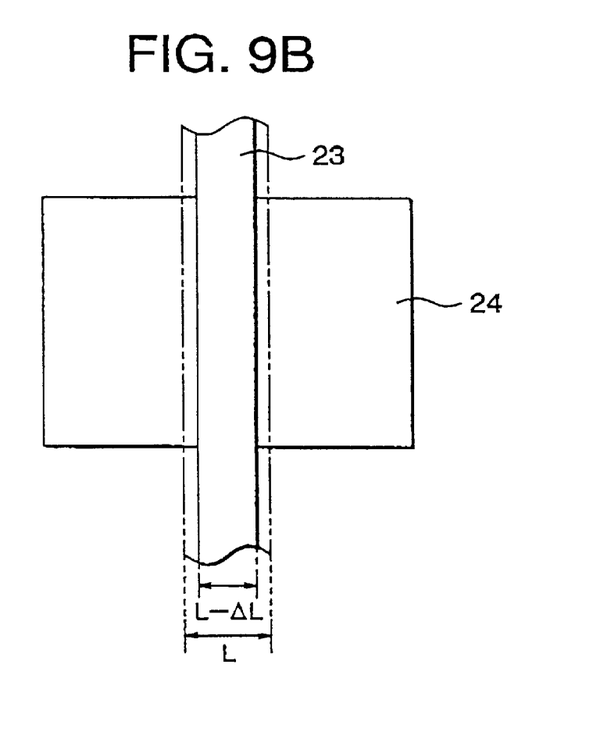

In actual processes, as mentioned above, it is extremely difficult to completely prevent variations in the gate lengths in the process of etching or the like, so that dimensional differences at the same degree occur in the clock drivers and the flip-flop groups. FIGS. 8A and 8B show the transistors in a case where the gate lengths become longer due to dimensional differences in the present embodiment, wherein FIG. 8A is a schematic view showing the transistor in the clock driver, and FIG. 8B is a schematic view showing the transistor in the flip-flop group. FIGS. 9A and 9B show the transistors in a case where the gate lengths become shorter due to dimensional differences in the present embodiment, wherein FIG. 9A is a schematic view showing the transistor in the clock driver, and FIG. 9B is a schematic view showing the transistor in the flip-flop group.

If the gate lengths become longer by "ΔL" due to dimensional differences, the gate length of the transistor composing the clock driver becomes "L+α+ΔL" as shown in FIG. 8A, and the gate length of the transistor composing the flip-flop group becomes "L+ΔL" as shown in FIG. 8B. Therefore, the relative error of the gate length in the clock driver becomes "L/(L+α)", and the relative error of the gate length in the flip-flop group becomes "ΔL/L".

On the other hand, if the gate lengths become shorter by "ΔL" due to dimensional differences, the gate length of the transistor composing the clock driver becomes "L+α−ΔL" as shown in FIG. 9A, and the gate length of the transistor composing the flip-flop group becomes "L−ΔL" as shown in FIG. 9B. Therefore, in this case as well, the relative error of the gate length in the clock driver becomes "ΔL/((L+α)", and the relative error of the gate length in the flip-flop group becomes "ΔL/L".

Thus, according to the present embodiment, even if dimensional differences occur in the process of etching or the like and the gate lengths increase or decrease, the relative error of the gate length in the clock driver is smaller than that in the flip-flop group. As a result, the difference in drive capability between the transistors is almost completely eliminated, so that skew of the transmitted clock signals CLK is suppressed.

The present inventor made a simulation of the clock tree constructed as mentioned above, and the following results were obtained. In this simulation, the minimum gate length was set to 0.18 μm, and the width of dispersion in the gate length "ΔL" was set to 0.018 μm. Then, when the designed gate length was expressed by "$L_0$", the actual gate length is expressed by the following equation 1.

$$L=L_0 \pm \Delta L (L_0 \geq 0.18)$$ [Equation 1]

Also, in this simulation, in place of the clock drivers, inverters were used. This is because, if the buffers as shown in FIG. 6A and FIG. 6B are used as the clock drivers in the simulation, influences from elements other than the gate lengths, for example, the balance between the inverter at the front stage and the inverter at the rear stage may arise. The results of this simulation are shown in FIG. 10.

Figure 10:
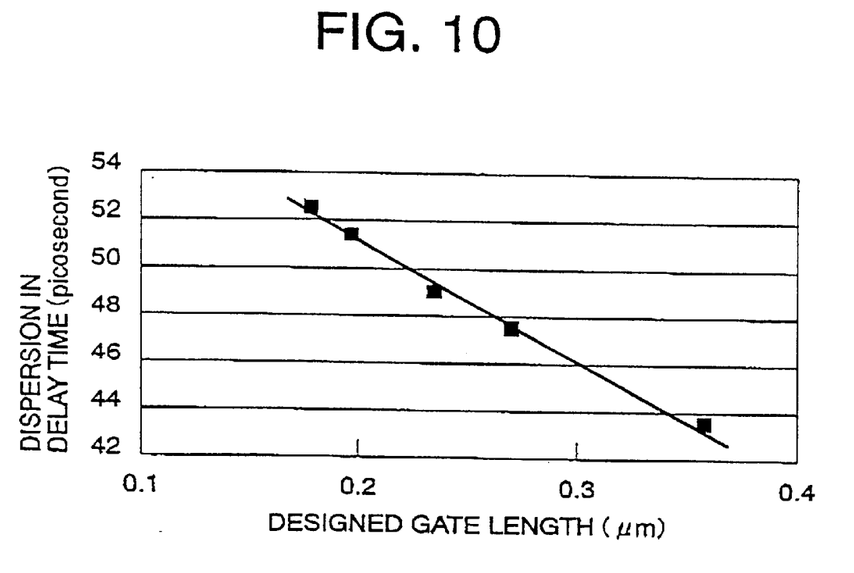
FIG. 10 is a graph showing the relationship between the designed gate lengths $L_0$ and dispersion in delay time.

As shown in FIG. 10, in a case where the width of dispersion in the gate length is constant, the greater the designed gate length "$L_0$", the smaller the dispersion in the delay time.

Figure 11:
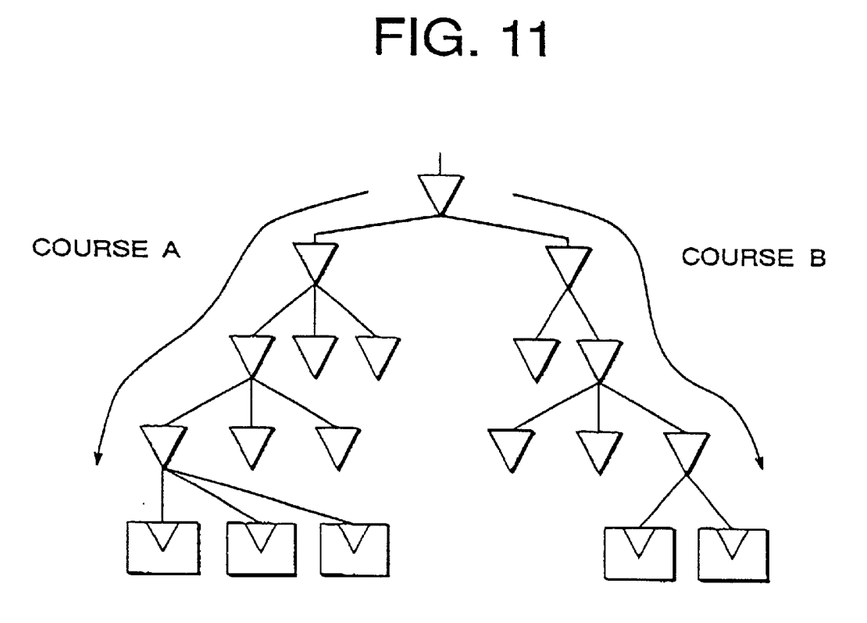
FIG. 11 is a schematic view showing a 4-stage clock tree.

For example, in a 4-stage clock tree, the effect of lowering clock skew described below is obtained. FIG. 11 is a schematic view showing the 4-stage clock tree. In this clock tree, in the manufacturing process, dimensional differences in the gate length occur in clock drivers other than the top-stage clock drivers. The gate length in the left course A becomes longer by ΔL, and the gate length in the right course B becomes shorter by ΔL. In this case, the delay time Tpd in the course A becomes greater, and the delay time Tpd in the course B becomes smaller, and this difference in the delay time appears as clock skew due to the dispersion in manufacturing.

In a case where the gate lengths of the transistors composing the flip-flop groups and the transistors composing the clock drivers are both set to 0.18 μm as in the conventional example, as shown in FIG. 10, and the dispersion in the delay time ΔTpd becomes 52.6 picoseconds, and clock skew when a clock signal is supplied to the flip-flop group becomes 157.8 picoseconds as can be seen from the following equation 2.

52.6 (picoseconds)×3 (stages)=157.8 (picoseconds)   Equation 2

On the other hand, in a case where the gate length of the transistors composing the flip-flop groups is designed to be 0.18 μm, and the gate length of the transistors composing the clock drivers is designed to be 0.234 μm, as shown in FIG. 10, the dispersion ΔTpd in delay time is 49.0 picoseconds, and clock skew when a clock signal is supplied to the flip-flop groups becomes 147.0 picoseconds as can be seen from Equation 3 shown below.

49.0 (picoseconds)×3 (stages)=147.0 (picoseconds)   Equation 3

Therefore, by designing the gate length to be long, the clock skew can be shortened by 10.8 picoseconds.

It can be clearly understood from this result and the above-mentioned embodiments that the dispersion in delay time of the transistors in the clock drivers, which has long gate lengths, is suppressed.

Furthermore, the gate length of the transistor composing the clock driver may be longer than that of the transistor of the logic circuit composing the flip-flop group, and in actuality, the gate length may be determined with the design unit of input data. For example, when the designed input data unit is 0.02 μm and the gate length of the transistors of the logic circuits in the flip-flop groups is 0.189 μm, the gate length of the transistors in the clock drivers may be 0.20 μm or more.

Figure 12:
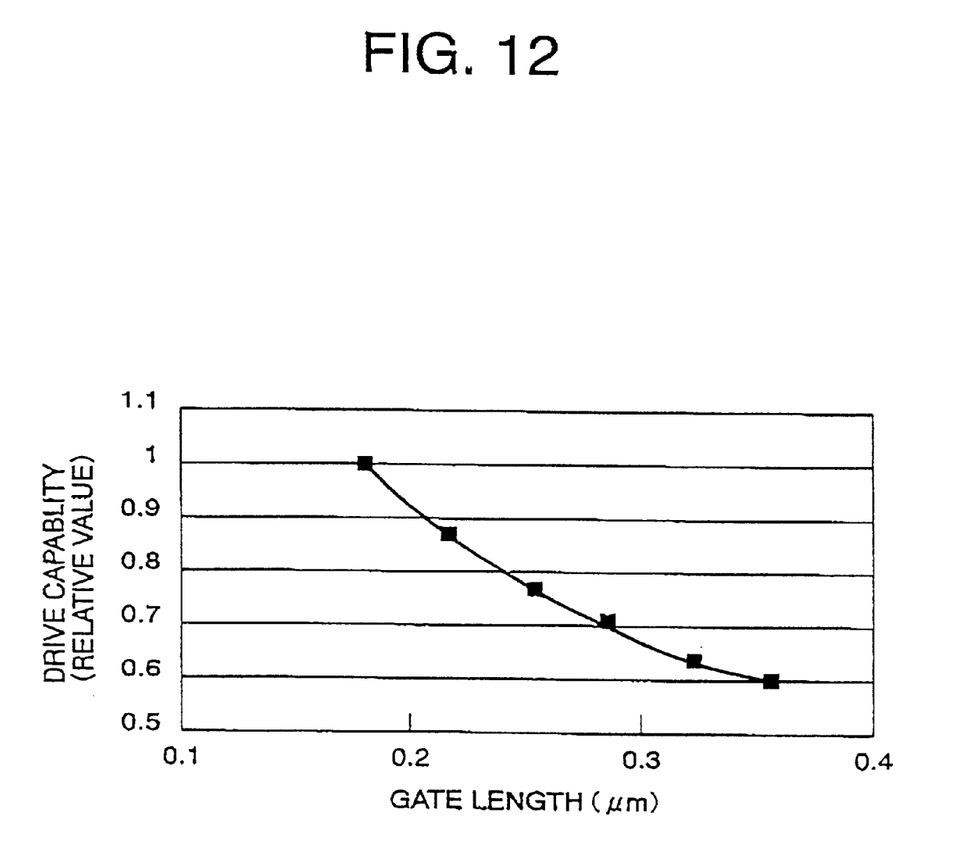
FIG. 12 is a graph showing the relationship between the gate length and the drive capability supposed to be 1 when the gate length is 0.18 µm.

On the other hand, if the gate length of the transistor composing the clock driver is made excessively long, the drive capability lowers, and depending on the conditions, the clock skew increases. In other words, in a case where the gate length is designed to be long without changing the gate width, the drive capability of the transistor lowers in accordance with the increase in the gate length. FIG. 12 is a graph showing the relationship between the gate length and the drive capability in a case where the drive capability is defined as 1 when the gate length is 0.18 μm.

Figure 13A:
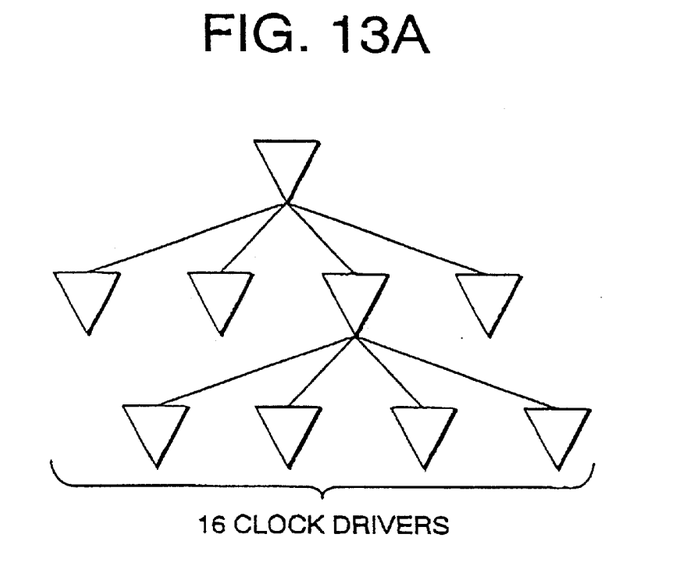
FIG. 13A is a schematic view showing an example of a clock tree in a case where one clock driver can drive four clock drivers.
Figure 13B:
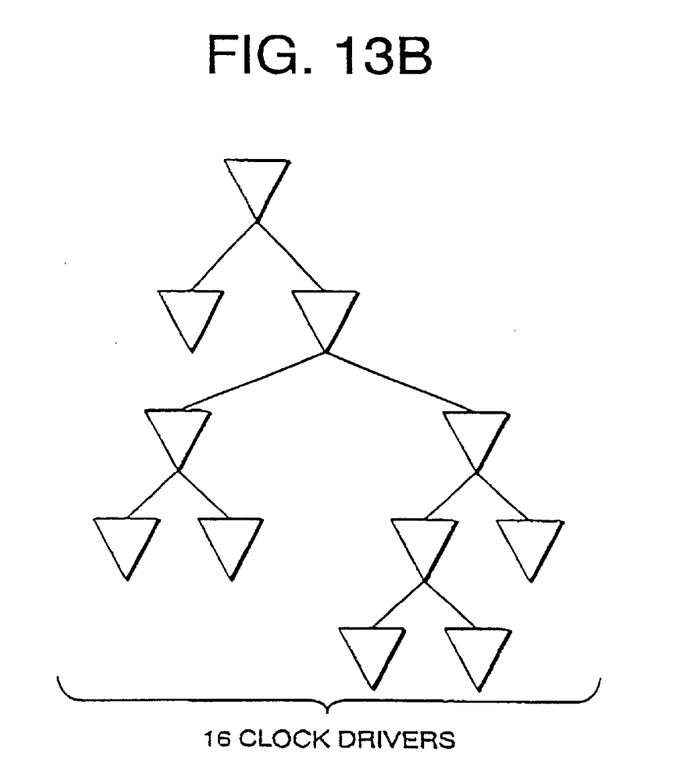
FIG. 13B is a schematic view showing an example of a clock tree in a case where one clock driver can drive two clock drivers.

In such a case, it may become necessary to increase the number of stages of the clock tree, and the clock skew may increase due to this increase in the number of stages. FIG. 13A is a schematic view showing an example of a clock tree in a case where one clock driver can drive four clock drivers, and FIG. 13B is a schematic view showing an example of a clock tree in a case where one clock driver can drive two clock drivers.

For example, as shown in FIG. 13A, when one clock driver can drive four clock drivers and sixteen drivers are provided at the extreme lower stage, the number of stages of the clock tree becomes 3. On the other hand, as shown in FIG. 13B, one clock driver can drive only two clock drivers, the number of stages of the clock tree becomes 5. As a result, the difference in delay time ΔTpd due to the dispersion in manufacturing of the clock drivers provided on the different number of stages, that is, two stages is added. Therefore, when the amount of decrease in the difference in delay time ΔTpd in accordance with an increase in the gate length is defined as A, and the amount of increase in the difference in delay time ΔTpd in accordance with the increased two stages is defined as B, if the relationship of "A<B" is established, clock skew increases due to the increase in the gate length.

When the number of clock drivers which can be driven by one clock driver is 5 in the clock tree shown in FIG. 13A, even if the drive capability is lowered to 80% (4÷5), it becomes unnecessary to increase the number of stages of the clock tree. In this case, as shown in FIG. 12, the gate length of the transistor composing the clock driver can be lengthened to approximately 0.234 μm, that is, approximately 1.3 times.

Furthermore, the gate lengths may be equal to each other or different from each other between the clock drivers which comprise the clock tree, and the gate lengths may depend on the loads of the flip-flop groups to be connected to the terminal. Therefore, these gate lengths may be equal to each other in the same class, or different from each other between different classes, for example.

Moreover, by lengthening the gate lengths as in the above embodiments mentioned above, the drive capability lowers, however, this lowering can be compensated by widening the gate widths. As a result, the area of the transistors composing the clock driver may increase, however, this increase does not cause an increase in the entire area of the LSI chip since the ratio of the transistors which compose the clock drivers accounting for the entire LSI chip is extremely small.

What is claimed is:

1. A semiconductor integrated circuit, comprising:

logic circuits which have transistors; and a clock tree including clock drivers which have transistors to distribute a signal to said logic circuits, gate lengths of said transistors provided in said clock drivers being longer than that of said transistors provided in said logic circuits, so that a relative error in gate length resulting from manufacturing dispersion in said transistors provided in said clock drivers is smaller than a relative error in gate length resulting from manufacturing dispersion in said transistors provided in said logic circuits.

2. The semiconductor integrated circuit according to claim 1, wherein said logic circuits operate in synchronization with the same clock signal.

3. The semiconductor integrated circuit according to claim 1, wherein said logic circuits compose an internal circuit of a chip.

4. The semiconductor integrated circuit according to claim 2, wherein said logic circuits compose an internal circuit of a chip.

5. The semiconductor integrated circuit according to claim 1, wherein said gate lengths of said transistors provided in said clock drivers are equal to each other in the same stage in said clock tree.

6. The semiconductor integrated circuit according to claim 2, wherein said gate lengths of said transistors provided in said clock drivers are equal to each other in the same stage in said clock tree.

7. The semiconductor integrated circuit according to claim 3, wherein said gate lengths of said transistors provided in said clock drivers are equal to each other in the same stage in said clock tree.

8. The semiconductor integrated circuit according to claim 4, wherein said gate lengths of said transistors provided in said clock drivers are equal to each other in the same stage in said clock tree.

9. A method of designing a semiconductor integrated circuit which has logic circuits which have transistors and a clock tree including clock drivers which have transistors, said clock drivers distributing a clock signal to said logic circuits, said method comprising the step of:

setting gate lengths of said transistors provided in said clock drivers so as to be longer than that of said transistors provided in said logic circuits, so that a relative error in gate length resulting from manufacturing dispersion in said transistors provided in said clock drivers is smaller than a relative error in gate length resulting from manufacturing dispersion in said transistors provided in said logic circuits.

10. The method of designing a semiconductor integrated circuit according to claim 9, wherein said logic circuits operate in synchronization with the same clock signal.

11. The method of designing a semiconductor integrated circuit according to claim 9, wherein said logic circuits compose an internal circuit of a chip.

12. The method of designing a semiconductor integrated circuit according to claim 10, wherein said logic circuits compose an internal circuit of a chip.

13. The method of designing a semiconductor integrated circuit according to claim 9, wherein the step of setting said gate lengths comprises the step of setting said gate lengths of said transistors provided in said clock drivers so as to be equal to each other in the same stage in said clock tree.

14. The method of designing a semiconductor integrated circuit according to claim 10, wherein the step of setting said gate lengths comprises the step of setting said gate lengths of said transistors provided in said clock drivers so as to be equal to each other in the same stage in said clock tree.

15. The method of designing a semiconductor integrated circuit according to claim 11, wherein the step of setting said gate lengths comprises the step of setting said gate lengths of said transistors provided in said clock drivers so as to be equal to each other in the same stage in said clock tree.

16. The method of designing a semiconductor integrated circuit according to claim 12, wherein the step of setting said gate lengths comprises the step of setting said gate lengths of said transistors provided in said clock drivers so as to be equal to each other in the same stage in said clock tree.

17. A semiconductor integrated circuit comprising:

a plurality of logic circuits; and a clock tree including a plurality of clock drivers for distributing clock signals to the logic circuits; wherein the gate lengths of all clock drivers comprising the clock tree are equal to a predetermined value which is longer than the gate length for each of the plurality of logic circuits.

* * * * *